United States Patent
Dow et al.

(10) Patent No.: US 6,849,356 B2
(45) Date of Patent: Feb. 1, 2005

(54) SEPARATED FLOW LIQUID CATHOLYTE ALUMINUM HYDROGEN PEROXIDE SEAWATER SEMI FUEL CELL

(75) Inventors: Eric G. Dow, Barrington, RI (US);
Susan G. Yan, Fairport, NY (US);
Maria G. Medeiros, Bristol, RI (US);
Russell R. Bessette, Mattapoisett, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 429 days.

(21) Appl. No.: 10/037,808

(22) Filed: Jan. 3, 2002

(65) Prior Publication Data

US 2003/0124418 A1 Jul. 3, 2003

(51) Int. Cl.[7] .......................... H01M 4/36; H01M 4/48; H01M 6/20; H01M 6/30; H01M 6/34
(52) U.S. Cl. ...................... 429/105; 429/110; 429/119
(58) Field of Search ................................ 429/105, 110, 429/119

(56) References Cited

U.S. PATENT DOCUMENTS

| | | | | |
|---|---|---|---|---|
| 4,492,741 A | * | 1/1985 | Struthers | ..................... 429/34 |
| 4,614,693 A | * | 9/1986 | Hashimoto et al. | ........... 429/72 |
| 5,445,905 A | * | 8/1995 | Marsh et al. | ................ 429/105 |
| 6,228,527 B1 | * | 5/2001 | Medeiros et al. | ........... 429/119 |

* cited by examiner

Primary Examiner—Patrick Ryan
Assistant Examiner—Julian Mercado
(74) Attorney, Agent, or Firm—Jean-Paul A. Nasser; James M. Kasischke; Michael F. Oglo

(57) ABSTRACT

The present invention relates to an improved semi-fuel cell and an improved cathode used therein. The semi-fuel cell stack comprises a housing, an anode within the housing, a porous cathode within the housing, an aqueous catholyte within the housing, an aqueous anolyte stream flowing in the housing, and a membrane for preventing migration of the catholyte through the porous cathode and into the anolyte stream. In a preferred embodiment of the present invention, the catholyte comprises an aqueous hydrogen peroxide solution, the anolyte comprises a NaOH/seawater solution, and the membrane permits passage of $OH^-$ ions while inhibiting the passage of hydrogen peroxide. The membrane is attached to a surface of the cathode or alternatively, impregnated into the cathode.

16 Claims, 2 Drawing Sheets

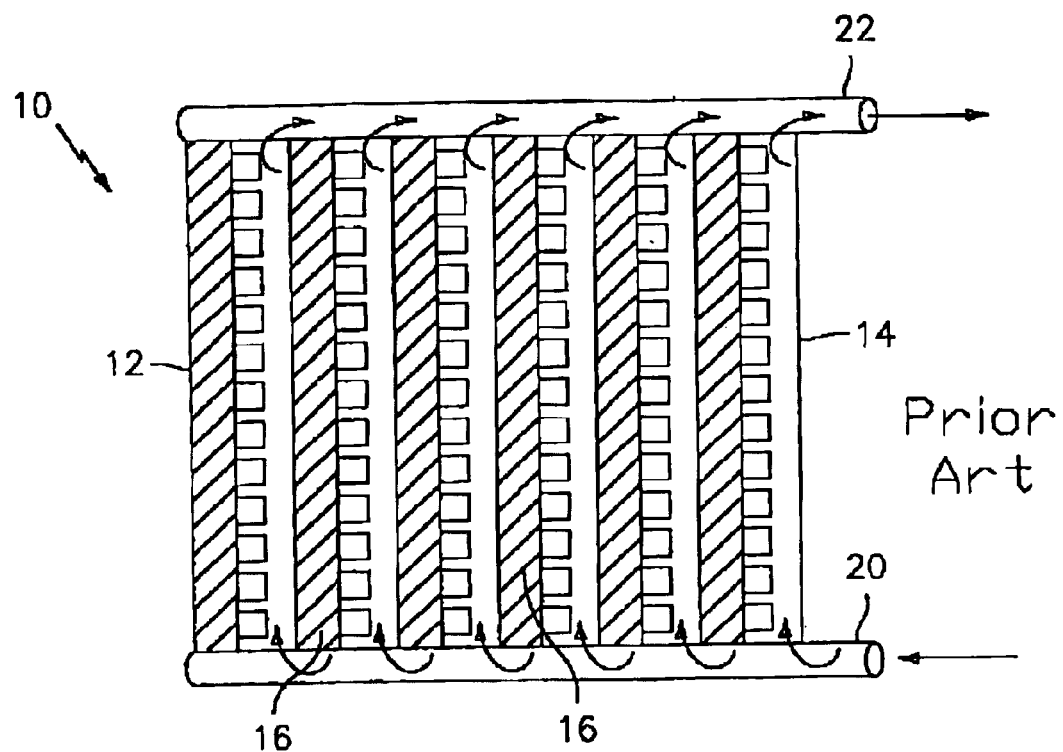
FIG. 1 *Prior Art*
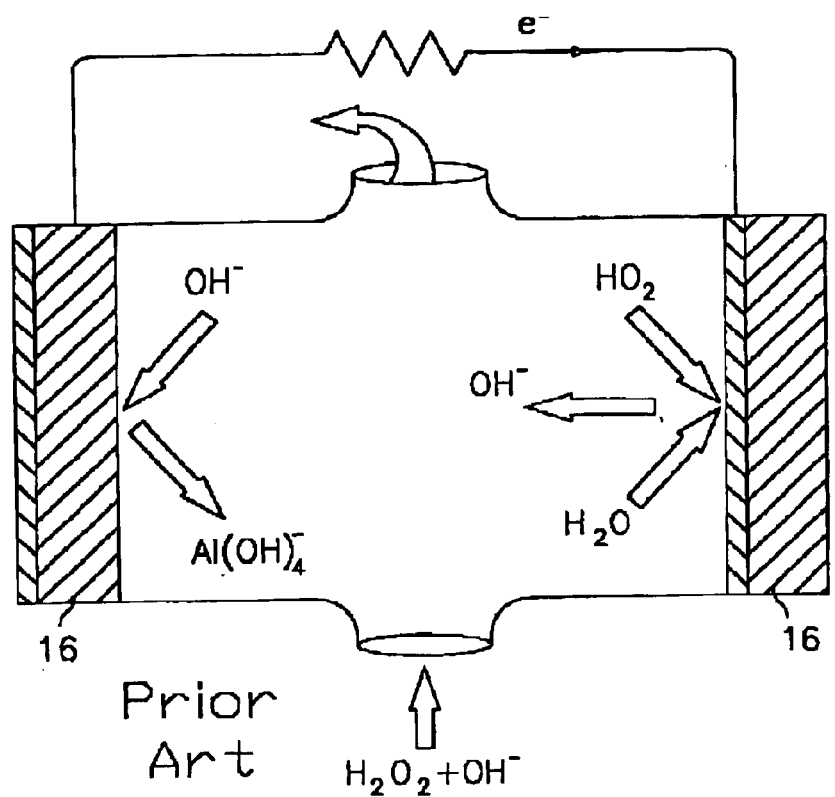
FIG. 2 *Prior Art*

SEPARATED FLOW LIQUID CATHOLYTE ALUMINUM HYDROGEN PEROXIDE SEAWATER SEMI FUEL CELL

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

Not applicable.

BACKGROUND OF THE INVENTION (1) Field of the Invention

The present invention relates to a liquid catholyte aluminum-hydrogen peroxide seawater semi fuel cell which has particular utility as an energy source for underwater vehicles.

(2) Description of the Prior Art

Primary batteries employing aqueous electrolytes have been under development since the 1940s. U.S. Pat. Nos. 4,296,184 to Stachurski, U.S. Pat. No. 4,352,864 to Struthers, U.S. Pat. No. 4,485,154 to Remick et al, U.S. Pat. No. 4,492,741 to Struthers, and U.S. Pat. No. 5,496,659 to Zito show some of the electrochemical power cells that have been developed.

The '184 patent to Stachurski illustrates an electrochemical cell which has at least two compartments separated by a semi-permeable membrane. The compartments contain first and second solvents, electrolyte and electrode. The first compartment is divided by a membrane which behaves as a bipolar electrode during the passage of electric current.

The '864 patent to Struthers illustrates a fuel cell which has a metal anode immersed in a base electrolyte solution and connected with an electric circuit, a cathode comprising an acid solution, a carbon catalyst and electron distributor plate in that solution and connected with an electron supply and a wettable impermeable membrane and disposed between the electrolyte and cathode solution and establishing an acid-base reaction interface where hydroxide ions are generated for conduction through the electrolyte to the anode.

The '154 patent to Remick et al. illustrates an electrically rechargeable anionically active reduction-oxidation electric storage-supply system and process. The system and process use a sodium or potassium sulfide-polysulfide anolyte reaction and an iodide-polyiodide, chloride-chlorine, or bromide-bromine species catholyte reaction. The catholyte and anolyte are separated by an ion selective membrane permeable to positive sodium and potassium ions and substantially impermeable to negative bromide, chloride, iodide, sulfide and polysulfide ions.

The '741 patent to Struthers illustrates a primary fuel cell including an elongate case defining a central ion exchange compartment with opposite ends and containing a liquid ionolyte. The case also defines an anode section at one end of the case and including a gas compartment containing boron monoxide gas fuel, a liquid compartment between the gas compartment and the ion exchange compartment and containing a liquid anolyte. The ionolyte and anolyte are separated by a cationic membrane. The gas and liquid compartments are separated by an anode plate including an electron collector part, a catalyst material carried by the part and a gas permeable hydrophobic membrane between the boron monoxide gas and the catalyst material.

The '659 patent to Zito illustrates an electrochemical apparatus having at least one cell. Each cell has a positive electrode and a negative electrode with a dual membrane in each cell dividing it into positive chambers for posilyte and anolyte solutions which are recirculated through separate pumps and storage tanks and back to the chambers. The dual membranes in each cell provide a third chamber between the positive chamber and the negative chamber through which an idler electrolyte is circulated.

Emphasis has been placed on aluminum and magnesium anodes due to their high faradic capacity, low atomic weight and high standard potentials. Of particular interest is their application to undersea vehicles due to the availability of seawater to act as an electrolyte or electrolyte solution, thus further enhancing their effectiveness as an energy source on a systems basis.

A useful electrochemical energy source must permit high voltages, have a large storage capacity, operate safely, and reliably deliver the stored energy over extended discharge times. Therefore, the energy source must achieve a reasonably high cell potential, have a high Faradaic capacity, and have a high energy density at low current densities. Additionally, the energy source must be relatively inexpensive, environmentally, and SSN friendly, safe, capable of a long shelf life, and not prone to spontaneous chemical or electrochemical discharge.

High energy density Al-Aqueous primary batteries and semi-fuel cells for high current density (>500 mA/cm$^2$) applications have been developed. These include aluminum-silver oxide and aluminum-hydrogen peroxide semi-fuel cells. U.S. Pat. No. 5,445,905 to Marsh et al. illustrates one such battery. In the Marsh et al. patent, a dual flow aluminum hydrogen peroxide battery is provided comprising an aqueous hydrogen peroxide catholyte, an aqueous anolyte, a porous solid electrocatalyst capable of reducing the hydrogen peroxide and separating the anolyte from the catholyte, and an aluminum anode positioned within the anolyte. The separation of the catholyte and anolyte chambers helps prevent hydrogen peroxide poisoning of the aluminum anode.

Despite these systems, there remains a need for a system with still better performance, particularly one in which the chemical reaction of the solution phase catholyte with the aluminum anode is eliminated.

SUMMARY OF THE INVENTION

Accordingly, it is an object of the present invention to provide a semi-fuel cell which has improved performance.

It is a further object of the present invention to provide a semi-fuel cell as above which has improved electrochemical efficiency and which can be used as a seawater energy source.

It is still a further object of the present invention to provide an improved method for operating a semi-fuel cell.

It is yet another object of the present invention to provide an improved cathode for use in a semi-fuel cell.

The foregoing objects are attained by the semi-fuel cell, the method, and the cathode of the present invention.

In accordance with the present invention, a semi-fuel cell broadly comprises a housing, an anode and a porous cathode in the housing, an aqueous catholyte stream flowing within the housing, an aqueous anolyte stream flowing in the housing and separated from the catholyte stream, and means for preventing migration of the catholyte through the porous cathode and into the anolyte stream. In a preferred embodiment of the present invention, the anolyte stream comprises a stream of NaOH/seawater electrolyte, the catholyte comprises an aqueous hydrogen peroxide solution, and the preventing means comprises a membrane attached to or impregnated into the porous cathode, which membrane allows passage of OH$^-$ ions through the membrane while inhibiting the flow of hydrogen peroxide through the membrane.

In accordance with another aspect of the present invention, a method for operating a semi-fuel cell broadly comprises the steps of: providing a housing having at least one anode and at least one porous cathode; flowing a catholyte stream into contact with said at least one porous cathode through at least one catholyte channel; flowing an anolyte stream into contact with at least one anode through at least one anolyte channel; and preventing contact between each respective anolyte stream and each respective catholyte stream.

Other details of the semi-fuel cell of the present invention, as well as other advantages and objects attendant thereto, are set forth in the following detailed description and the accompanying drawings wherein like reference numerals depict like elements.

BRIEF DESCRIPTION OF THE DRAWINGS

FIG. 1 is a schematic representation of a typical semi-fuel cell stack with a bi-polar cell stack configuration;

FIG. 2 is a schematic representation of the reactions which occur in the cell of FIG. 1.

DESCRIPTION OF THE PREFERRED EMBODIMENT(S)

Figure 3:
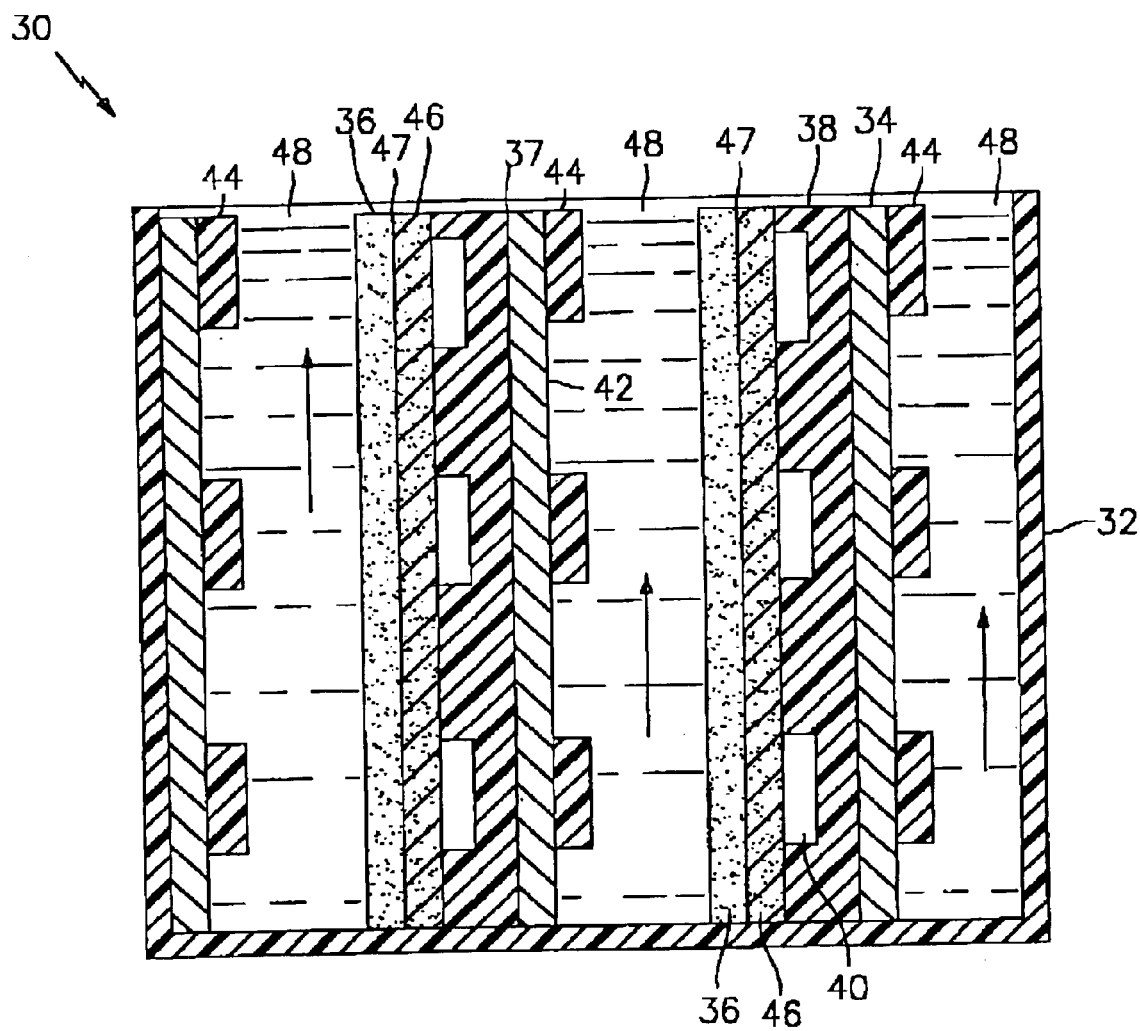
FIG. 3 is a schematic representation of a semi-fuel cell stack in accordance with the present invention.

FIG. 1 illustrates a typical solution phase catholyte semi-fuel cell stack 10. Solution phase means that the cathodic species is in solution with the flowing aqueous electrolyte within the cartridge cell stack. The semi-fuel cell stack 10 has an anode end plate 12, a cathode end plate 14, and a plurality of intermediate bipolar electrodes 16. The bipolar electrodes 16 are each metallic aluminum or magnesium anodes plated on one side with an inert conductive substrate such as nickel, copper or carbon catalyzed with palladium, iridium, or silver. This configuration results in a planar bipolar stack of cells 18 electrically connected in series.

Each cell stack 18 is hydraulically fed in parallel via an inlet conduit 20 with seawater and a low-concentration, 4 wt % sodium hydroxide aqueous electrolyte. The catholyte, consisting of a hydrogen peroxide solution, is carried separately and injected directly into the electrolyte and seawater mixture upstream of the cell gap at the required concentration, as determined by the system power load. An outlet conduit 22 is provided to remove spent electrolyte and spent catholyte.

Electrochemical reduction of the cathodic species, or catholyte, occurs on the electrocatalyst surface of the electrodes 16, receiving electrons from the anode oxidation reaction, which is depicted in FIG. 2. In a system such as this, the half cell and overall cell reactions can be written as follows:

Anode: $2Al+8OH^- \rightarrow 2Al(OH)_4^- +6e^-$

Cathode: $3H_2O_2+6e^- \rightarrow 6OH^-$

Overall Rxn: $2Al+3H_2O_2+2OH^- \rightarrow 2Al(OH)_4^-$, $E°_{cell\ theor.}$= 3.23V The problem with this type of system is that the catholyte, in this case hydrogen peroxide, is allowed to come into direct contact with the aluminum anode, resulting in a parasitic direct chemical reaction which does not produce electron transfer and only consumes active energetic materials, thus reducing the overall energy yield of the system. In most cases, this parasitic reaction will consume over 50% of the available energetic materials.

FIG. 3 illustrates an aluminum-hydrogen peroxide separated semi-fuel cell stack 30 in accordance with the present invention. The cell 30 eliminates the aforementioned parasitic reaction by not having the hydrogen peroxide catholyte mixed with the seawater and sodium hydroxide electrolyte. In fact, the two are maintained separate.

The cell stack 30 has a housing 32 which may be formed from any suitable material known in the art. Within the housing 32 are positioned a one or more anodes 34 and one or more cathodes 36. Each anode 34 is preferably formed from an aluminum containing material such as an aluminum alloy. Each cathode or positive electrode 36 is formed from a porous, electrically conductive material which has been catalyzed with at least one of palladium and iridium to effect improved electrochemical reduction of the catholyte. In a preferred embodiment, each cathode 36 is formed from a carbon fiber matrix material which has been catalyzed with palladium and iridium.

Attached to a first surface 37 of each anode 34 is a member 38 formed from an electrically non-conductive material such as a polypropylene material. The member 38 is shaped to form a number of flow channels 40 for the catholyte solution. The member 38 may be attached to the surface 37 of the anode 34 using any suitable means known in the art such as an adhesive.

Attached to a second surface 42 of each anode 34 is a plurality of separators 44. The separators 44 are also preferably formed from an electrically non-conductive material such as a polypropylene material and also may be attached to the surface 42 using any suitable means known in the art.

The cell stack 30 further has inlet means (not shown) for supplying the catholyte such as an aqueous hydrogen peroxide solution to the flow channels 40. If desired, the cell stack 30 can have an outlet means (not shown) for exhausting spent catholyte.

In accordance with the present invention, each cathode 36 is provided with means 46 for preventing migration of the catholyte through the porous cathode structure. The migration prevention means 46 preferably comprises a material or membrane which allows OH$^-$ ions which are created during the reduction of the catholyte to pass through itself while inhibiting the passage of hydrogen peroxide through the material or membrane 46. The material or membrane may be attached to a surface 47 of the respective cathode 36 so as to cover the surface 47. Alternatively, the material or membrane may be impregnated into the respective cathode 36. When a membrane is used for the migration preventing means 46, the membrane may be a microporous membrane or an anion selective membrane.

As can be seen from FIG. 3, the cell 30 has one or more flow channels 48 for the anolyte, which is preferably a NaOH/seawater electrolyte. The flow channels 48 are located between the anode surface 42 and a surface of the cathode 36 containing the migration preventing means 46. As can be seen from this description, the anolyte flowing through the channels 48 never comes into contact with the catholyte. The cell stack 30 may be provided with inlet means (not shown) for supplying anolyte to each of the flow channels 48 and outlet means (not shown) for exhausting spent anolyte from each of the flow channels 48. Further, the hydrogen peroxide catholyte is introduced into the semi-fuel cell 30 on the side of the cathode or positive electrode 36 away from the anode 34.

As mentioned before, the migration preventing means 46 allows ions which are created during the reduction of the hydrogen peroxide catholyte to travel into the NaOH/seawater electrolyte to complete the charge balance during the electrochemical reaction.

The operation of semi-fuel cell stack 30 requires the separate metering of the liquid hydrogen peroxide catholyte so that the catholyte is not mixed with any seawater or electrolyte as it enters or exits the cell stack 30. If desired, the catholyte flow may be dead ended within the cell stack 30.

In a preferred embodiment of the present invention, the seawater electrolyte is mixed with sodium hydroxide, injected into the flow channels 48 and passed through the cell stack 30. This is desirable to carry heat and $Al(OH)^-_4$ reaction product out of the cell stack 30.

The concentration of the hydrogen peroxide metered into the cell stack 30 can be at concentrations as high as about 70% or as low as about 0.001%. The static hydraulic pressure of the hydrogen peroxide liquid channel(s) 40 preferably is greater than the sodium hydroxide/seawater pressure. This difference in pressure is a function of the cathode and/or membrane porosity.

Introduction of a separate flow channel for the pure hydrogen peroxide catholyte eliminates solution phase mixing. Prior art cells had separated flow but used a mixed flow of hydrogen peroxide and seawater and sodium hydroxide, requiring greater volume flow capacity, thus yielding lower energy density. Incorporation of an anion-selective or microporous membrane onto the surface or within the surface of each cathode 36 is most advantageous. The membrane allows OH$^-$ ions to pass through it, and inhibits the transfer through it of hydrogen peroxide liquid. Prior art cells had mixed hydrogen peroxide with sodium hydroxide, which results in the de-protonation of the hydrogen peroxide into $HO_2^-$ ions. The anion selective membrane would be ineffective under these prior art circumstances.

One of the advantages to the semi-fuel cell of the present invention is improved electrochemical efficiency by upwards of 75%. This is achieved by reducing and substantially eliminating the chemical reaction which occurs in solution phase semi-fuel cells between the catholyte and the anode.

The half cell and overall cell reactions for the cell 30 of the present invention can be written as follows:

Anode: $2Al+8OH^- \rightarrow 2Al(OH)^-_4+6e^-$
Cathode: $3H_2O_2+6e^- \rightarrow 6OH^-$
Overall Rxn: $2Al+3H_2O_2+2OH^- \rightarrow 2Al(OH)^-_4$.

The semi-fuel cell configuration of the present invention could be used for other liquid phase catholyte semi-fuel cells with aluminum alloy anodes and other liquid catholytes such as sodium hypochlorite. In other systems, the particular membrane used for the migration preventing means 46 may be chosen on the basis of the particular anions or cations which are to be transferred.

The semi-fuel cell stack 30 of the present invention can be used as energy systems such as those required for undersea vehicle applications requiring high energy storage such as torpedo propulsion and unmanned underwater vehicle applications.

It is apparent that there has been provided in accordance with the present invention a separated flow liquid catholyte aluminum hydrogen peroxide seawater semi-fuel cell which fully satisfies the objects, means, and advantages set forth hereinbefore. While the present invention has been described in the context of specific embodiments thereof, other alternatives, modifications, and variations will become apparent to those skilled in the art having read the foregoing description. Therefore, it is intended to embrace those alternatives, modifications, and variations as fall within the broad scope of the appended claims.

What is claimed is:

1. A semi-fuel cell stack comprising:
    a housing;
    an anode and a porous cathode in said housing;
    an aqueous catholyte stream of hydrogen peroxide flowing within said housing;
    an aqueous anolyte stream flowing in said housing; and
    a membrane which allows selective ion transfer of OH$^-$ ions through said membrane and into the anolyte stream and which inhibits transfer of hydrogen peroxide through said membrane for preventing migration of said catholyte through the porous cathode and into the anolyte stream.

2. A semi-fuel cell stack according to claim 1 wherein said membrane is in contact with said porous cathode.

3. A semi-fuel cell stack according to claim 2 wherein said membrane covers a surface of said porous cathode.

4. A semi-fuel cell stack according to claim 2 wherein said membrane is impregnated into said porous cathode.

5. A semi-fuel cell stack according to claim 1 wherein said cathode comprises a catalyzed material.

6. A semi-fuel cell stack according to claim 1 wherein said cathode comprise a carbon fiber matrix catalyzed with at least one of palladium and iridium.

7. A semi-fuel cell stack according to claim 1 further comprising means for creating a plurality of flow channels for said catholyte attached to said anode.

8. A semi-fuel cell stack according to claim 7 wherein said flow channel creating means is formed from an electrically non-conductive material.

9. A semi-fuel cell stack according to claim 1 wherein said anolyte stream comprises a NaOH/seawater electrolyte stream.

10. A semi-fuel cell stack according to claim 1 wherein said anode is formed from an aluminum containing material.

11. A semi-fuel cell stack according to claim 1 wherein said catholyte comprises an aqueous sodium hypochlorite solution.

12. A semi-fuel cell stack according to claim 1 further comprising:
    at least two anodes within said housing;
    at least two porous cathodes within said housing;
    means attached to each of said anodes for creating a plurality of flow channels for said catholyte;
    means attached to a surface of each of said porous cathodes for preventing migration of said catholyte through each said cathode; and
    a plurality of anolyte flow streams within said housing with each of said streams flowing between a surface of one of said anodes and a surface of said migration preventing means.

13. A semi-fuel cell stack according to claim 12 wherein:
    each of said anodes is formed from an aluminum containing material;

each of said porous cathodes is formed from a porous material which has been catalyzed with at least one of palladium and iridium;

said anolyte comprises an aqueous seawater/NaOH solution;

said catholyte comprises an aqueous hydrogen peroxide solution; and said migration preventing means comprises a membrane for allowing a flow of $OH^-$ ions through the membrane into said anolyte stream while inhibiting the transfer of hydrogen peroxide through the membrane.

14. A method for operating a semi-fuel cell stack comprising the steps of:

providing a housing having at least one anode and at least one porous cathode;

flowing a catholyte stream into contact with said at least one porous cathode through at least one cathode channel;

flowing an anolyte stream into contact with said at least one anode through at least one anolyte channel; and providing each said cathode with a membrane which allows $OH^-$ ions to pass through said membrane while inhibiting a flow of hydrogen peroxide through said membrane thereby preventing migration of said catholyte through the porous cathode and into the anolyte stream.

15. A method according to claim 14 wherein:

said catholyte flowing step comprises flowing at least one stream of an aqueous hydrogen peroxide solution into contact with said at least one porous cathode; and said anolyte flowing step comprises flowing at least one stream of a NaOH/Seawater anolyte into contact with said at least one cathode.

16. A method according to claim 15 wherein said catholyte flowing step comprises flowing said hydrogen peroxide solution at a hydraulic pressure greater than the pressure of the NaOH/seawater anolyte.

* * * * *